United States Patent Office.

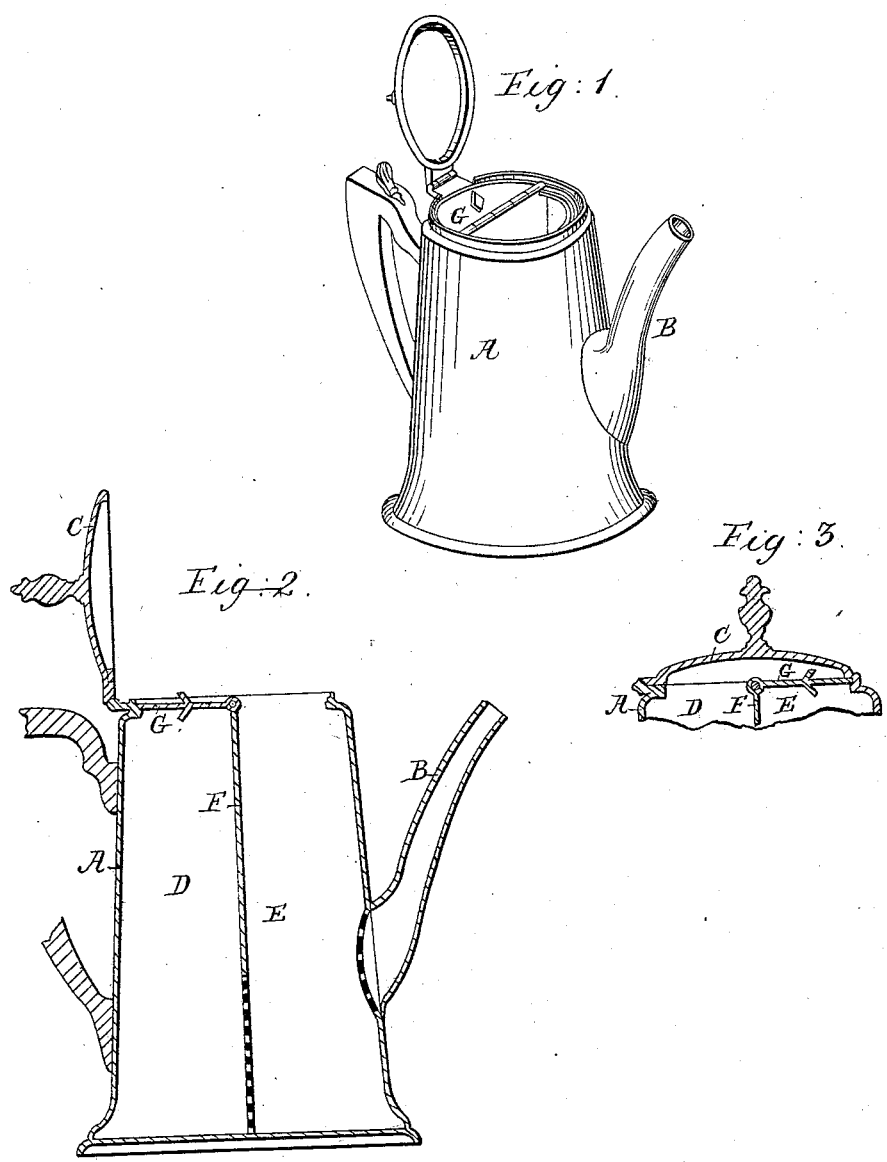

SAMUEL SIMPSON, OF WALLINGFORD, CONNECTICUT, ASSIGNOR TO SIMPSON, HALL, MILLER, AND COMPANY, OF SAME PLACE.

Letters Patent No. 90,790, dated June 1, 1869.

TEA AND COFFEE-POT.

The Schedule referred to in these Letters Patent and making part of the same.

*To all whom it may concern:*

Be it known that I, SAMUEL SIMPSON, of Wallingford, in the county of New Haven, and State of Connecticut, have invented a new Improvement in Tea and Coffee-Pots; and I do hereby declare the following, when taken in connection with the accompanying drawings, and the letters of reference marked thereon, to be a full, clear, and exact description of the same, and which said drawings constitute part of this specification, and represent, in—

Figure 1, a perspective view;

Figure 2, a vertical central section, the cover open; and in

Figure 3, a partial section, the cover closed.

This invention relates to an improvement in that class of pots in which a filter is introduced, so that the tea or coffee placed in one part, and water poured thereon, will leach through into the other part, the spout being attached to the last-named part, so that the clear tea or coffee will pass therethrough.

In this class of pots, as heretofore constructed, there has been more or less liability to scatter a portion of the grains of coffee, or the leaves of tea, into the part of the pot to which the spout is attached; and further, the cover closing over the whole, more or less of the aroma unavoidably escapes from the pot.

To avoid the two last is the object of my invention, which consists in dividing the pot, and arranging an auxiliary cover, so that the said auxiliary cover will close either of the two divisions, as the case may be.

In order to the clear understanding of my invention, I will fully describe the same, as illustrated in the accompanying drawings.

A is the pot, B, the spout, and C, the cover, of common construction.

The body of the pot is divided into two divisions, D and E, by a partition, F, the lower part of the partition being perforated so as to form a communication between the two divisions.

The partition F is placed centrally in the pot, so that a cover, G, will close either part, by being turned over the one or other, as in fig. 2 or fig. 3.

To prepare the tea or coffee, turn the auxiliary cover G to the position denoted in fig. 3, then place the ground coffee, or leaves of tea, in the division D, and pour boiling water thereon. In this position, the cover G prevents the scattering of the coffee or tea into the part E, and when a sufficient quantity of water has been poured into the division D, then turn the cover from over the division E on to the division D, as seen in fig. 2, thus preventing the escape of the aroma from the division D, everything from the said division D passing through the perforations in the partition F into the division E, and thence, when required, off through the spout B.

Having fully described my invention,

What I claim as new and useful, and desire to secure by Letters Patent, is—

In a pot, divided by the perforated division F, the arrangement of the cover G so as to close either of the two divisions, in the manner substantially as herein set forth.

SAMUEL SIMPSON.

Witnesses:
ANDREW ANDREWS,
MONROE BENHAM.